(12) United States Patent
Joyner et al.

(10) Patent No.: US 8,542,958 B2
(45) Date of Patent: Sep. 24, 2013

(54) COMPACT PHOTONIC INTEGRATED CIRCUIT HAVING GEOMETRICALLY ARRANGED ACTIVE AND PASSIVE REGIONS

(75) Inventors: Charles H. Joyner, Sunnyvale, CA (US); Peter W. Evans, Mountain House, CA (US); Masaki Kato, Palo Alto, CA (US)

(73) Assignee: Infinera Corporation, Sunnyvale, CA (US)

( * ) Notice: Subject to any disclaimer, the term of this patent is extended or adjusted under 35 U.S.C. 154(b) by 751 days.

(21) Appl. No.: 12/611,112

(22) Filed: Nov. 2, 2009

(65) Prior Publication Data

US 2010/0172611 A1    Jul. 8, 2010

Related U.S. Application Data

(60) Provisional application No. 61/110,605, filed on Nov. 2, 2008.

(51) Int. Cl.
*G02B 6/12* (2006.01)
*G02B 6/00* (2006.01)

(52) U.S. Cl.
USPC .......................................................... 385/14

(58) Field of Classification Search
USPC ........... 385/14, 15, 16, 147, 24, 37; 359/124, 359/130
See application file for complete search history.

(56) References Cited

U.S. PATENT DOCUMENTS

| | | | | |
|---|---|---|---|---|
| 4,274,706 | A * | 6/1981 | Tangonan | 385/37 |
| 5,745,270 | A * | 4/1998 | Koch | 398/79 |
| 6,697,411 | B2 * | 2/2004 | Hoose et al. | 372/92 |
| 2004/0067006 | A1 * | 4/2004 | Welch et al. | 385/14 |
| 2005/0025409 | A1 * | 2/2005 | Welch et al. | 385/14 |

* cited by examiner

*Primary Examiner* — Akm Enayet Ullah
(74) *Attorney, Agent, or Firm* — Ross M. Carothers; David L. Soltz

(57) ABSTRACT

According to this disclosure, embodiments of the present invention include photonic integrated circuits having active and passive geometric regions geometrically arranged to provide for more compact integrated photonic integrated circuits which, in turn, leads to higher chip yields and lower fabrication costs.

19 Claims, 4 Drawing Sheets

COMPACT PHOTONIC INTEGRATED CIRCUIT HAVING GEOMETRICALLY ARRANGED ACTIVE AND PASSIVE REGIONS

CROSS-REFERENCE TO RELATED APPLICATIONS

This application claims priority to U.S. Provisional Application No. 61/110,605 filed Nov. 2, 2008 which is herein incorporated by reference in its entirety.

BACKGROUND OF THE INVENTION

1. Field of the Invention

This invention relates generally to photonic integrated circuits and, more particularly, to photonic integrated circuits which have compact architectures.

2. Description of the Related Art

Monolithic photonic integrated circuits (PICs), also sometimes referred to as planar lightwave circuits (PLCs), are increasingly deployed in modern optical telecommunication systems. These devices provide the integration of both active and passive optical components on a single substrate and are integrated with other optical components to form a multi-functional optical device for use in such systems. The gravitation to PICs is strong because it leads to the utility of providing an entire system function, let alone a component function, in a single chip in a single package. Compared to the deployment of discrete optical components, such monolithic PIC chips can significantly reduce the size of optical components necessary in the optical system, as part of a transmitter photonic integrated circuit (TxPIC) or a receiver photonic integrated circuit (RxPIC) for example, as well as significantly reduce the overall costs in a system. Examples of such TxPICs and RxPICs are disclosed in U.S. Pat. Nos. 7,283,694; 7,116,851; 7,079,715; and 7,058,246, all of which are incorporated herein in their entirety by reference.

What is needed is a photonic integrated circuit having on-chip active and passive elements located within corresponding active and passive geometric regions arranged to provide for more compact photonic integrated circuits, ultimately leading to higher chip yields and lower fabrication costs.

SUMMARY OF THE INVENTION

According to this disclosure, embodiments of the present invention include photonic integrated circuits having an active geometric region geometrically arranged with respect to other passive elements as to provide for more compact integrated photonic integrated circuits which, in turn, leads to higher chip yields and lower fabrication costs.

In the various embodiments of the present invention, a photonic integrated circuit includes a substrate having a first area and an active geometric region having a second area, where the ratio of the second area to the first area is greater than, or equal to, 0.5. In certain embodiments of the present invention the active geometric region has a first boundary defined by a first one of a plurality of signal channels and a second boundary defined by a second one of a plurality of signal channels, and remaining ones of the plurality of signal channels are positioned between the first and second ones of the plurality of signal channels. In still other embodiments of the present invention, the photonic integrated circuit includes an optical combiner, the plurality of signal channels and the optical combiner arranged such that a line extending through a first of a plurality of optical elements in each of the plurality of signal channels substantially normal to a longitudinal axis of each of the corresponding plurality of signal channels, also extends through a portion of the optical combiner. In certain embodiments, the first of the plurality of optical elements is a laser source. In certain other embodiments the output of the photonic integrated circuit is substantially normal to a longitudinal axis of a signal channel, as part of the active geometric region. In still other certain embodiments disclosed herein, radio-frequency (RF) bond pads of certain active elements as part of the active geometric region are positioned closer to associated electronic circuitry to allow for single component-level circuits and shorter transmission lines between such bond pads and associated electronic circuitry. Other various embodiments of the present invention apply both to TxPICs as well as RxPICs.

BRIEF DESCRIPTION OF THE DRAWINGS

In the drawings wherein like reference symbols refer to like parts.

DETAILED DESCRIPTION OF THE INVENTION

Figure 1:
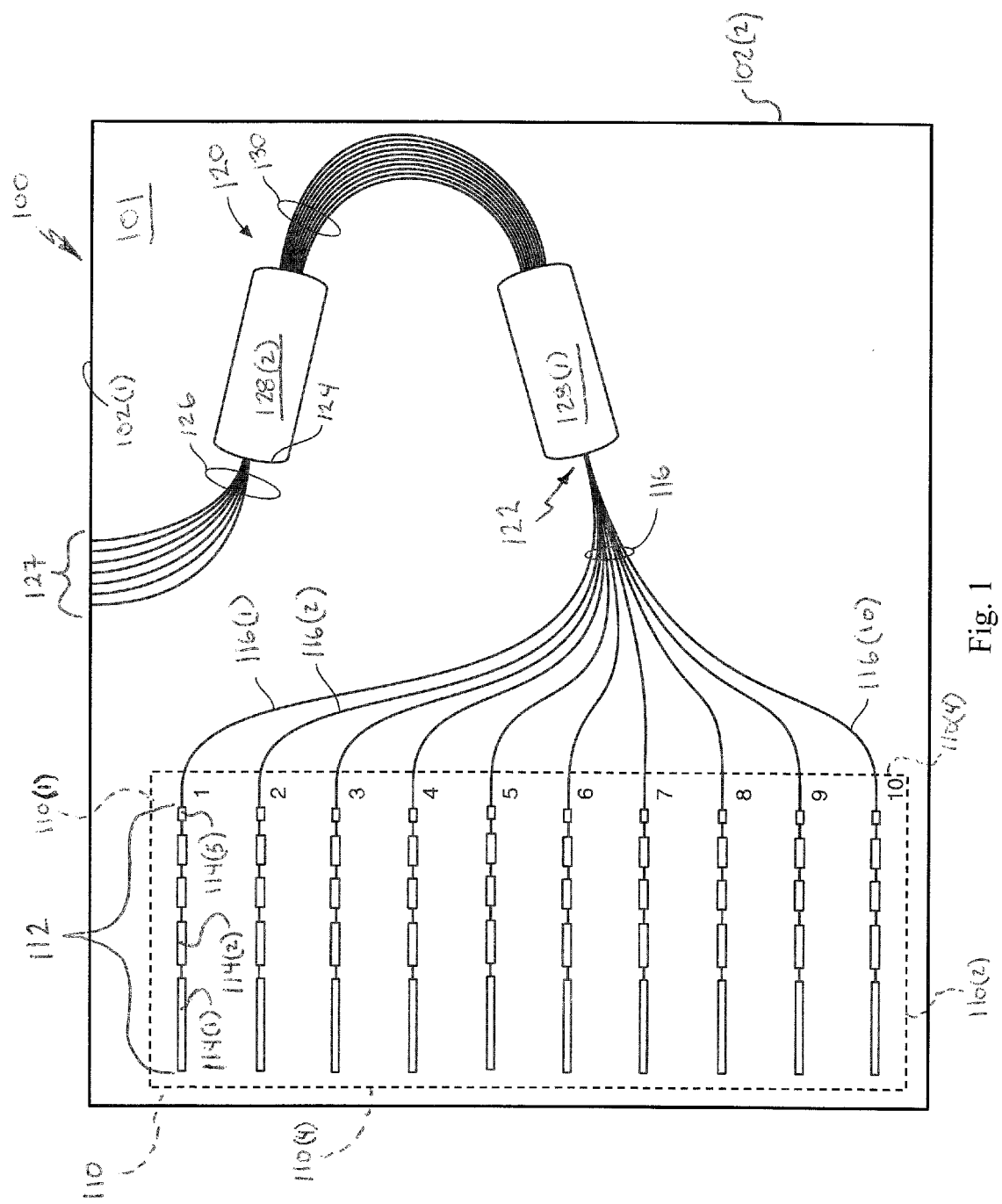
FIG. 1 is a general circuit diagram depicting a first arrangement of integrated components.

Reference is now made to FIG. 1, a general circuit diagram depicting a first arrangement of integrated components or elements will be discussed in greater detail. FIG. 1 depicts a photonic integrated circuit 100 generally comprising a substrate 101, an active region 110, depicted in dashed-line, and additional passive elements including an optical combiner 120 and the various waveguide structures utilized to guide optical energy along the photonic integrated circuit 100, as discussed in greater detail below. For purposes of the discussion herein, the active geometric region indicates that portion of the photonic integrated circuit devoted to the placement of active components. The active geometric region 110 includes a number of optical signal channels 112. The active geometric region 110 has a first boundary 110(1) and a second boundary 110(2) along a first dimension, e.g. a width, of the active geometric region 110, and a third boundary 110(3) and a fourth boundary 110(4) along a second dimension, e.g. a length, of the active geometric region 110. Each of the optical signal channels 112 comprise a plurality of optical elements 114 for creation and proper propagation of optical signals throughout the photonic integrated circuit 100.

The output of each optical signal channel 112 of active geometric region 110 is provided on one of a plurality of inputs 122 of the combiner 120 via a corresponding optical waveguide 116, such as waveguide 116(1) associated with optical signal path of channel 1 for example. The optical signal propagating along waveguide 116(1) passes through an input free space region 128(1), grating arms 130, and provided at an output 124 of the combiner via an output free space region 128(2). The optical combiner 120 combines each of the optical signals received, e.g. all the optical signals associated with optical signal channels 1 through 10, into a wave division multiplexed (WDM) signal which is then output on a plurality of output waveguides 126. In turn, optical waveguides 126 each provide the WDM signal to a corresponding one of a plurality of outputs 127 along one of a plurality of facets 102 bordering the photonic integrated circuit, a facet 102(1) of the photonic integrated circuit 100 for example.

In the photonic integrated circuit 100 of FIG. 1, the active geometric region 110, generally outlined in dashed line, occupies less than half of the total area of the photonic integrated circuit 100 when the optical elements 114 of the signal channels 112 and the optical combiner 120 are arranged as depicted in FIG. 1.

Figure 2:
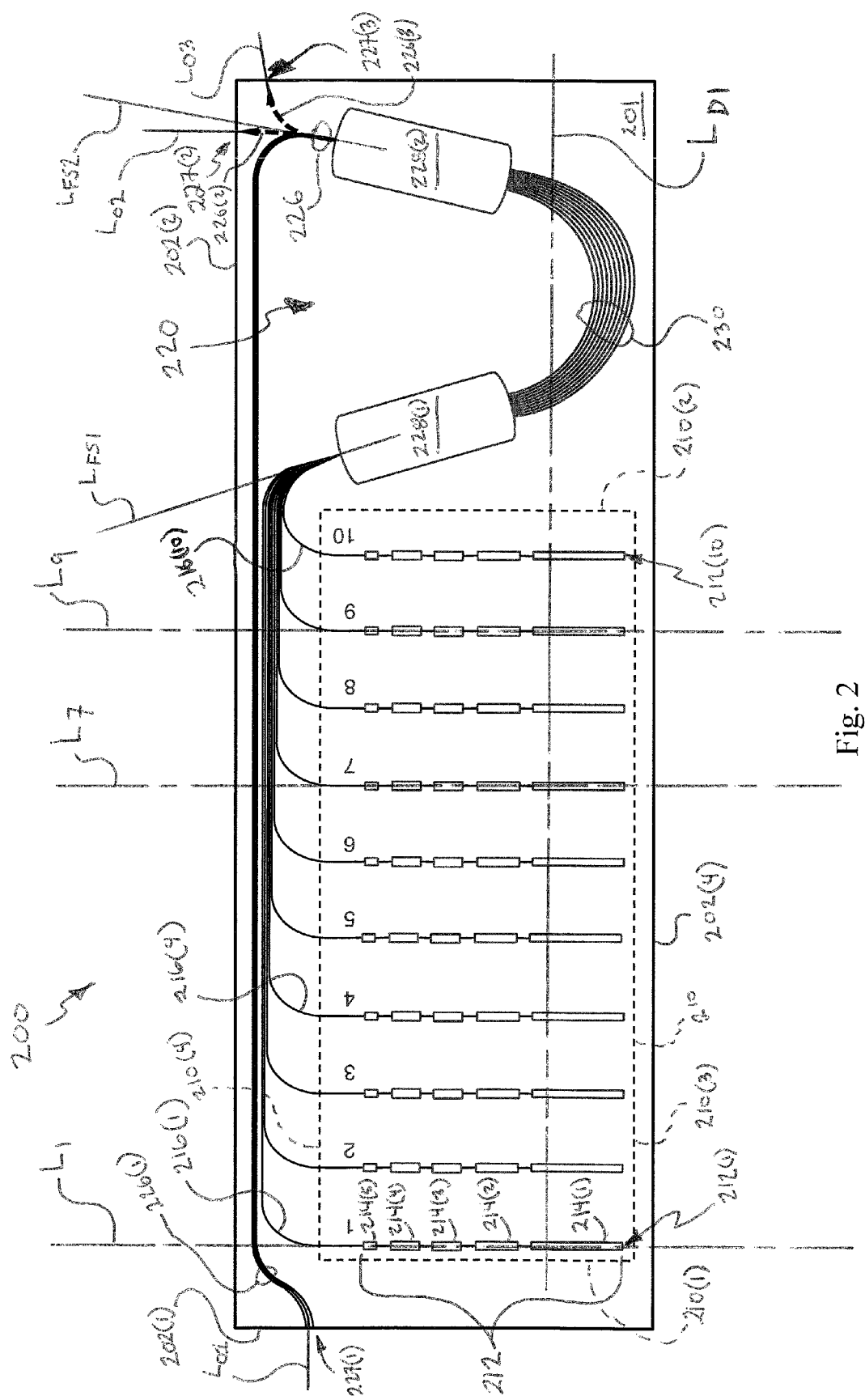
FIG. 2 is a circuit diagram depicting an arrangement of integrated components in accordance with various embodiments of the present invention.

With respect to FIG. 2, a circuit diagram depicting an arrangement of integrated components in accordance with various embodiments of the present invention is depicted. More specifically, FIG. 2 depicts a photonic integrated circuit 200 including similar components as circuit 100, as well as an active geometric region 210 generally outlined in dashed-line. Photonic integrated circuit 200 comprises a plurality of optical signal channels 212 provided on a substrate 201, each including a plurality of optical elements 214. The outputs of each of the optical signal channels 212 are directed to an optical combiner 220, provided on the substrate 201, via a plurality of optical waveguides 216. While depicted as a arrayed waveguide grating (AWG), the combiner 220 can be any suitable combiner, such as an Echelle grating for example. The optical combiner 220 combines each of the optical signals received, e.g. all the optical signals associated with optical signal channels 1 through 10, into an WDM signal which is then output on a plurality of output waveguides 226. In turn, optical waveguides 226 each provide the WDM signal to a corresponding one of a plurality of outputs 227 along one of a plurality of facets 202 bordering the photonic integrated circuit, output waveguides 226(1) providing the WDM signal to an output 227(1) along a facet 202(1) of the photonic integrated circuit 200 for example. Second and third exemplary outputs are also depicted. More specifically, output waveguides 226(2) can provide a plurality of outputs 227(2) on a second facet 202(2) or a plurality of output waveguides 226(3) can provide a plurality of outputs 227(3) on a third facet 202(3). As with other embodiments discussed herein, in accordance with the present invention, a plurality of output waveguides 226 are provided. Only one of such outputs obtained from one of the plurality of output waveguides 226 may be utilized, for example the one most suitable for transmission over a network infrastructure. The remaining ones of the plurality of output waveguides 226 may be utilized for other purposes such as signal monitoring.

While ten such optical signal channels 212 are depicted, for example optical channels 1 through 10 identified as 212($n$), it should be apparent that more or less of such optical channels could be present. Such optical elements 214 within each signal channel 212 include, but are not limited to, laser sources, modulated laser sources, modulators such as electro-absorption modulators or Mach-Zehnder modulators, semiconductor optical amplifiers (SOA), variable optical attenuators, photodetectors or photodiodes, or any other optical element which can be used for signal conditioning or monitoring of the optical signals for transport through the photonic integrated circuit. For illustration purposes, each optical signal channel 212 may include a laser source 214(1), an SOA 214(2), and a photodetector 214(5), among other elements. It is important to note that every optical signal channel 212 need not comprise the same optical elements, nor the same optical elements in the same order as described with respect to signal channel 212(1).

Active geometric region 210 has a first boundary 210(1) and a second boundary 210(2) generally defined by a first signal channel 212(1) and a second signal channel 212(10), and a third boundary 210(3) and a fourth boundary 210(4) extending from the first boundary to the second boundary, as depicted. Each signal channel 212 has a geometric longitudinal axis, for example a line $L_1$ of a plurality of lines $L_n$ extends through the longitudinal axis along signal channel 212(1). In similar fashion, lines $L_7$ and $L_9$, extend through the longitudinal axis along signal channels 212(7) and 212(9), respectively, are depicted as well. Each of the lines $L_n$, where n is the number of optical signal channels present, extending through the longitudinal axis of each of the signal channels 212 are substantially parallel to each other, and thus substantially parallel to the first and second boundaries 210(1), 210(2) of the active geometric region 210, and substantially perpendicular to the third and fourth boundaries 210(3), 210(4) of the active geometric region 210. As depicted, the first and second boundaries 210(1), 210(2) have a length which is shorter than the third and fourth boundaries 210(3), 210(4). The optical combiner 220 is positioned along a shorter one of the boundaries, that is, along the second boundary 210(2) in the exemplary configuration of FIG. 2 which provides for a more efficient design. For illustration purposes, the optical combiner 220 may be positioned with respect to the active geometric region 210 such that a line $L_{D1}$ which extends through each of the laser sources 214(1) substantially normal to each of the lines $L_n$ extending through the corresponding longitudinal axis of each signal channel 212, also extends through a portion of the combiner 220. The active geometric region 210 of the photonic integrated circuit 200, while the same general size as the active geometric region 110 of circuit 100 since both comprise similar optical elements 114, 214 in each corresponding signal channel 112, 212, assumes a larger portion of the total circuit 200 area when compared to the active geometric region 110. That is, the ratio of the active geometric region 210 area to the total area of the substrate 201, e.g. the photonic integrated chip area, is larger than the ratio of the active geometric region 110 to the total area of the substrate 101. Preferably, the ratio of the active geometric region 210 area to the total area of the substrate 201 is greater than or equal to about 0.5. This increase in the ratio of active geometric region area to total substrate area is achieved, as discussed above, by positioning the combiner 220 adjacent the shortest of the boundaries 210(1)-210(4) of the active geometric region 210.

The optical combiner 220 comprises a first free space region 228(1) and a second free space region 228(2) and a plurality of waveguides 230 coupling the first free space region 228(1) to the second free space region 228(2). Optical waveguides 216 have a first end coupled to a corresponding one of the optical signal channels 212 and a second end coupled to the first free space region 228(1). The first end of each of the output waveguides 216 has a longitudinal axis equivalent to the longitudinal axis of the corresponding signal channel. For example, the line $L_1$ extending through the longitudinal axis of the signal channel 212(1) also extends through the longitudinal axis of the first end of output waveguide 226(1). With the optical combiner 220 oriented as shown in FIG. 2, the second end of each of the output waveguides 116 couples to the first free space region 228(1) having a longitudinal axis generally parallel to a line $L_{FS1}$. As such, the longitudinal axis of each of the first ends of each of the optical waveguides 216 is substantially parallel to the longitudinal axes of each of the second ends of the optical waveguides 216. Each of the output waveguides 226 have a first end coupled to the second free space region 228(2) of the optical combiner 220. Each of the first ends of the output waveguides 226 couples to the second free space region 228(2) having a longitudinal axis generally parallel to a line $L_{FS2}$. A line $L_{O1}$ extends parallel to the longitudinal axis of a second end of each of the output waveguides 226(1), a line $L_{O2}$ extends parallel to the longitudinal axis of a second end of each of the alternative output waveguides 226(2), and a line $L_{O3}$ extends parallel to the longitudinal axis of a third end of each of the alternative output waveguides 226(3). The line $L_{FS2}$ being substantially parallel to the line $L_{O1}$, and substantially perpendicular to line $L_{O1}$ and $L_{O2}$. When used herein as a comparison of longitudinal axes corresponding to first and second ends of optical waveguides 216, first and second ends of output waveguides 226, as well as first and second ends of like elements in the embodiments of FIGS. 3 and 4, the term "substantially parallel" means more parallel than perpendicular and the term "substantially perpendicular" means more perpendicular than parallel.

As should be readily understood, the geometric arrangement of photonic integrated circuit 200 of FIG. 2, as well as the exemplary embodiments of FIGS. 3 and 4 discussed below, results in a greater area ratio of the active geometric region 210 with respect to the total area of circuit 200. This, in turn, leads to more dense wafers and higher chip yields, as well as a corresponding reduction in associated fabrication costs. The geometric arrangement depicted in FIG. 2 has additional advantages. First, a reduction in transmission line effects as between electrical circuitry external to circuit 200 and one or more optical elements 214 is reduced, electrically connected through the use of bond pads for example. One or more optical elements 214 may require an electrical interface to provide an electrical connection to electrical circuitry located proximate to the photonic integrated circuit 200. The geometric structure, or overall shape, of the photonic integrated circuit 200 reduces the distance between each of the elements 214 and the perimeter of the circuit 200 as defined by the various output facets 202, such as facet 202(4).

Second, a reduction in scattered light can also be achieved through selection of the appropriate output signals. Utilizing the outputs 127(2) at the output facet 202(2) or the outputs 127(3) at the output facet 202(3) will reduce the scattered light which may impact the output signals, as well as provide an overall shorter output path leading to facet 202(2) or facet 202(3), respectively, which also results in power savings.

As should be apparent to one of ordinary skill in the art, while the active geometric region 210 comprising the optical signal channels 212 represents a majority of active elements on the photonic integrated circuit 200, the active geometric region 210 may not comprise each and every active device as part of photonic integrated circuit 200.

Figure 3:
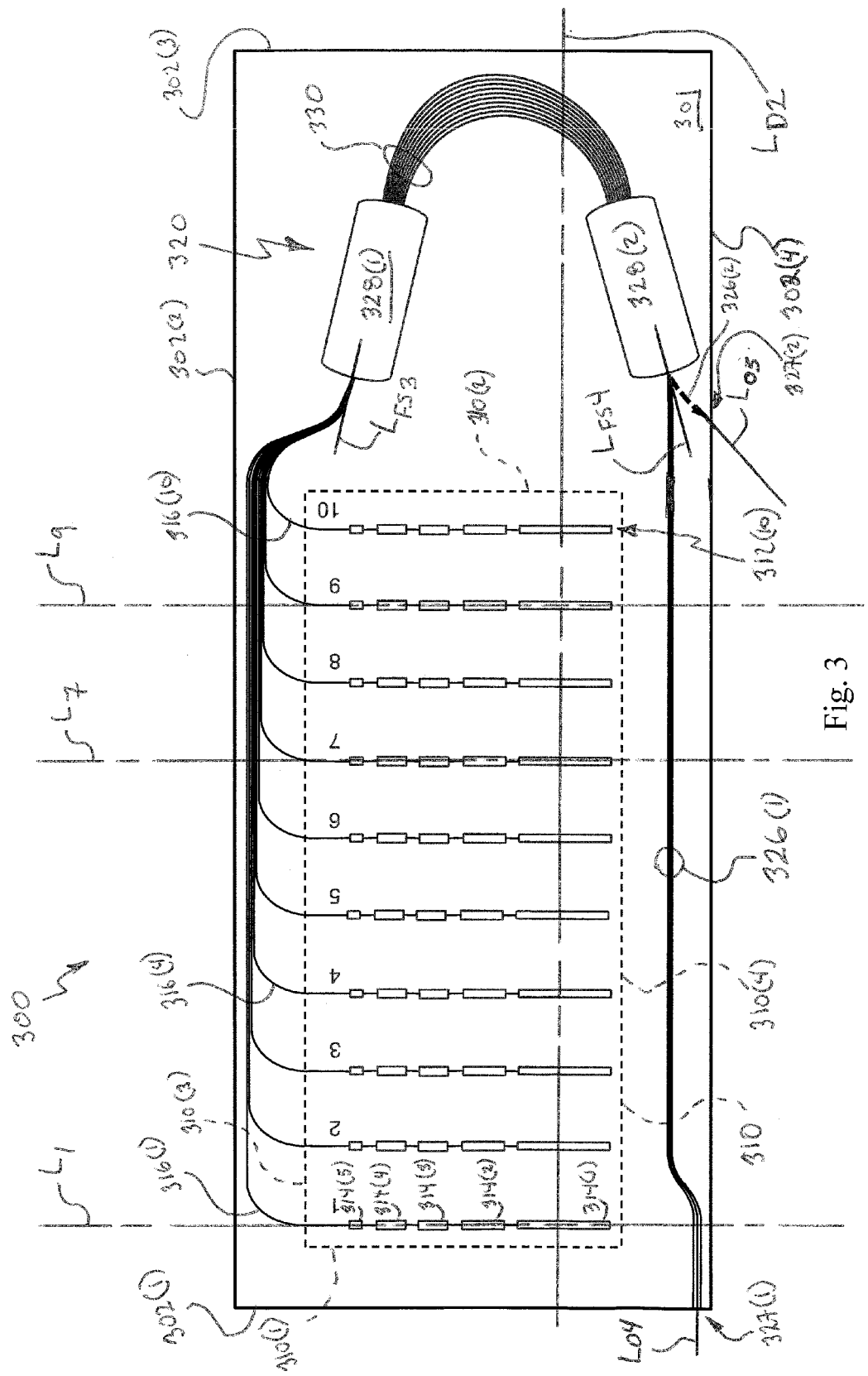
FIG. 3 is a circuit diagram depicting another arrangement of integrated components in accordance with various embodiments of the present invention.

With reference to FIG. 3, a circuit diagram depicting another arrangement of integrated components in accordance with various embodiments of the present invention is shown. FIG. 3 depicts a photonic integrated circuit 300 similar to the circuit 200 of FIG. 2, however includes a combiner 320 which is rotated 90° counter-clockwise with respect to the orientation of combiner 220 of circuit 200 of FIG. 2. Photonic integrated circuit 300 comprises a plurality of optical signal channels 312 provided on a substrate 301, each including a plurality of optical elements 314. The outputs of each of the optical signal channels 312 are directed to an optical combiner 320, provided on the substrate 301, via a plurality of optical waveguides 316. The optical combiner 320 comprises a first free space region 328(1) and a second free space region 328(2) and a plurality of waveguides 330 coupling the first free space region 328(1) to the second free space region 328(2). The optical combiner 320 combines each of the optical signals received, e.g. all the optical signals associated with optical signal channels 1 through 10, into an WDM signal which is then output on a plurality of output waveguides 326. In turn, optical waveguides 326 each provide the WDM signal to a corresponding one of a plurality of outputs 327 along one of a plurality of facets 302 bordering the photonic integrated circuit 300, output waveguides 326(1) providing the WDM signal to an output 327(1) along a facet 302(1) of the photonic integrated circuit 300 for example. A second exemplary output is also depicted. More specifically, output waveguides 326(2) can provide a plurality of outputs 327(2) on a second facet 302(2).

Active geometric region 310, in dashed-line, has a first boundary 310(1) and a second boundary 310(2) generally defined by a first signal channel 312(1) and a second signal channel 312(10), and a third boundary 310(3) and a fourth boundary 310(4) extending from the first boundary to the second boundary, as depicted. Similar to the photonic circuit 200 of FIG. 2, each signal channel 312 has a geometric longitudinal axis, for example a line $L_1$ of a plurality of lines $L_n$ extends through the longitudinal axis along signal channel 312(1). In similar fashion, lines $L_7$ and $L_9$, extend through the longitudinal axis along signal channels 312(7) and 312(9), respectively, are depicted as well. Each of the lines $L_n$, where n is the number of optical signal channels present, extending through the longitudinal axis of each of the signal channels 312 are substantially parallel to each other, and thus substantially parallel to the first and second boundaries 310(1), 310(2) of the active geometric region 310, and substantially perpendicular to the third and fourth boundaries 310(3), 310(4) of the active geometric region 310. As depicted, the first and second boundaries 310(1), 310(2) have a length which is shorter than the third and fourth boundaries 310(3), 310(4). The optical combiner 320 is positioned along a shorter one of the boundaries, that is, along the second boundary 310(2) in the exemplary configuration of FIG. 3 which provides for a more efficient design. For illustration purposes, the optical combiner 320 may be positioned with respect to the active geometric region 310 such that a line $L_{D2}$ which extends through each of the laser sources 314(1) substantially normal to each of the lines $L_n$ extending through the corresponding longitudinal axis of each signal channel 312, also extends through a portion of the combiner 320. More specifically, for example the line $L_{D2}$, as shown, may extend between the first free space region 328(1) and the second free space region 328(2) of the combiner 320, and further extend through the plurality of waveguides 330. With the active geometric region 310 area generally equal to the active geometric region 210 area, and the total area of the substrate 301 generally equal to the total area of the substrate 201, a ratio of the active geometric region 310 area to the total area of the substrate 301 of photonic integrated circuit 300 is greater than or equal to about 0.5.

Optical waveguides 316 have a first end coupled to a corresponding one of the optical signal channels 312 and a second end coupled to the first free space region 328(1). The first end of each of the optical waveguides 316 has a longitudinal axis equivalent to the longitudinal axis of the corresponding signal channel. For example, the line $L_1$ extending through the longitudinal axis of the signal channel 312(1) also extends through the longitudinal axis of the first end of optical waveguide 316(1). With the optical combiner 320 oriented as shown in FIG. 3, the second end of each of the optical waveguides 316 couples to the first free space region 228(1) having a longitudinal axis generally parallel to a line $L_{FS3}$. As such, the longitudinal axis of each of the first ends of each of the optical waveguides 316 is substantially perpendicular to the longitudinal axes of each of the corresponding second ends of the optical waveguides 316. Each of the output waveguides 326 have a first end coupled to the second free space region 328(2) of the optical combiner 320. Each of the first ends of the output waveguides 326 couples to the second free space region 328(2) having a longitudinal axis generally parallel to a line $L_{FS4}$. A line $L_{O4}$ extends parallel to the longitudinal axis of a second end of each of the output waveguides 326(1) and a line $L_{O5}$ extends parallel to the longitudinal axis of a second end of each of the alternative output waveguides 326(2). The line $L_{FS4}$ being substantially parallel to the line $L_{O4}$ and line $L_{O5}$.

With this arrangement, while providing for a more compact photonic integrated circuit, the signal channel waveguides 316 are distanced from output waveguides 326 further reducing optical noise as between the optical signals propagating therethrough. FIG. 3 further depicts outputs 327(1) provided on a first facet 302(1) as well as exemplary outputs 327(4) provided on a second chip facet 302(4).

Figure 4:
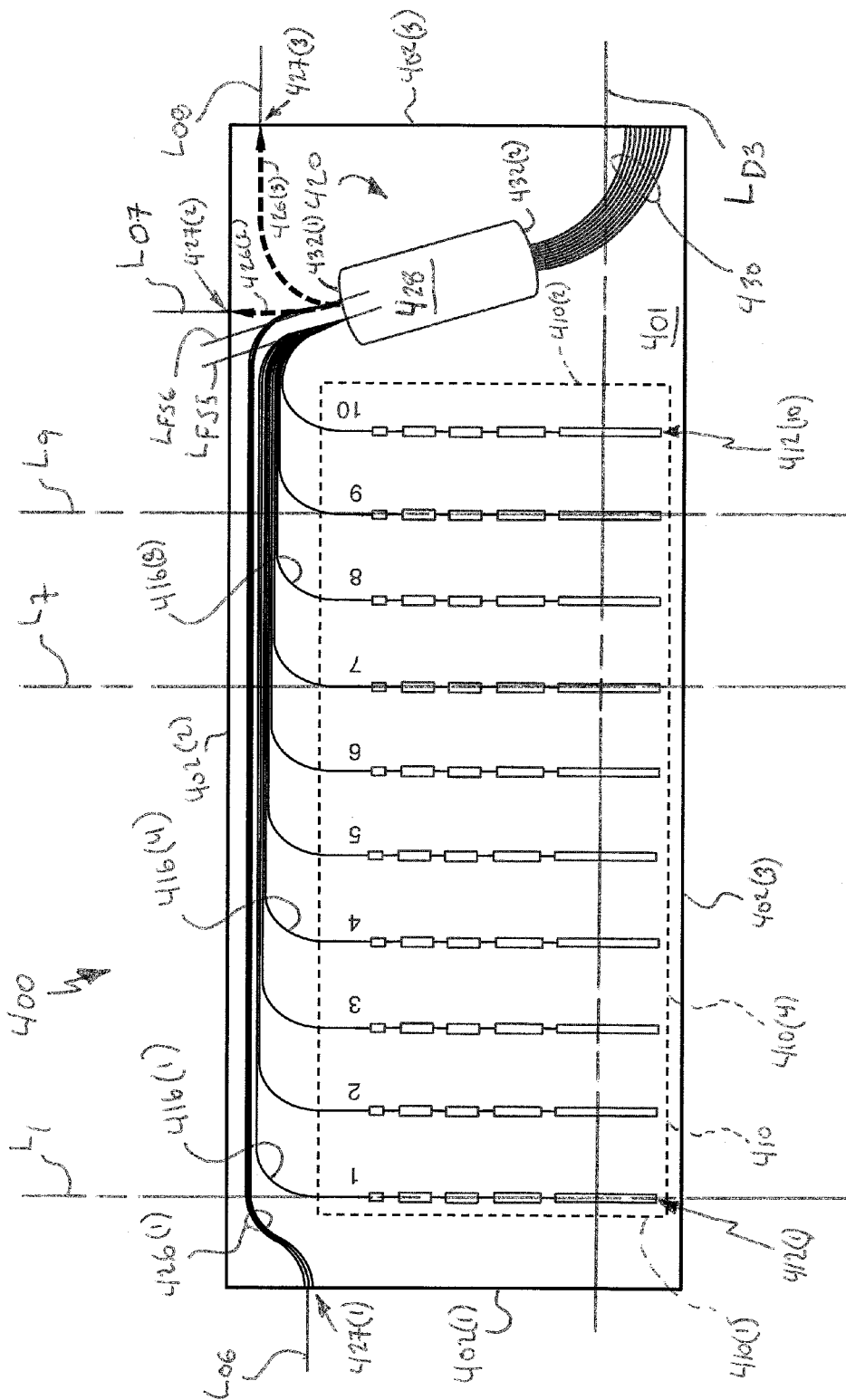
FIG. 4 is a circuit diagram depicting still another arrangement of integrated components in accordance with various embodiments of the present invention.

With respect to FIG. 4, a circuit diagram depicting another arrangement of integrated components in accordance with various embodiments of the present invention is depicted. More specifically, FIG. 4 depicts a photonic integrated circuit 400 comprising similar components as circuit 200, an active geometric region 410 identified in dashed-line. As with circuit 200, circuit 400 depicts ten signal channels, e.g. signal channels 1 through 10, of a plurality of associated optical signal channels 412.

Photonic integrated circuit 400 comprises a plurality of optical signal channels 412 provided on a substrate 401, each including a plurality of optical elements 414. The outputs of each of the optical signal channels 412 are directed to an optical combiner 420, provided on the substrate 401, via a plurality of optical waveguides 416. The optical combiner 420 includes a free space region 428 having a first end 432(1) which includes an input portion optically coupled to the plurality of waveguides 416, and an output portion optically coupled to a plurality of output waveguides 426. The free space region 420 also includes a second end 432(2) which is optically coupled to a plurality of waveguides 430. As depicted, the distal ends of waveguides 430 interface with the facet 402(3). The surface of facet 402(3) is configured to reflect the optical signal passing through each of the corresponding waveguides 430 such that the optical signals are redirected back into the free space region 428. The reflected optical signals are combined into a WDM signal which is then provided to the first plurality of outputs 427. More information regarding the reflective combiner 440 can be found in U.S. Pat. No. 7,444,048, which is incorporated herein in its entirety by reference. The output waveguides 426 each provide the WDM signal to a corresponding one of a plurality of outputs 427 along one of a plurality of facets 402 bordering the photonic integrated circuit 400, output waveguides 426(1) providing the WDM signal to an output 427(1) along a facet 402(1) of the photonic integrated circuit 400 for example. Second and third exemplary outputs are also depicted. More specifically, alternative output waveguides 426(2) can provide a plurality of outputs 427(2) on a second facet 402(2), and alternative output waveguides 426(3) can provide a plurality of outputs 427(3) on a third facet 402(3).

Active geometric region 410, in dashed-line, has a first boundary 410(1) and a second boundary 410(2) generally defined by a first signal channel 412(1) and a second signal channel 412(10), and a third boundary 410(3) and a fourth boundary 410(4) extending from the first boundary to the second boundary, as depicted. Similar to the photonic circuit 200 of FIG. 2, each signal channel 412 has a geometric longitudinal axis, for example a line $L_1$ of a plurality of lines $L_n$ extends through the longitudinal axis along signal channel 412(1). In similar fashion, lines $L_7$ and $L_9$, extend through the longitudinal axis along signal channels 412(7) and 412(9), respectively, are depicted as well. Each of the lines $L_n$, where n is the number of optical signal channels present, extending through the longitudinal axis of each of the signal channels 412 are substantially parallel to each other, and thus substantially parallel to the first and second boundaries 410(1), 410(2) of the active geometric region 410, and substantially perpendicular to the third and fourth boundaries 410(3), 410(4) of the active geometric region 410. As depicted, the first and second boundaries 410(1), 410(2) have a length which is shorter than the third and fourth boundaries 410(3), 410(4). The optical combiner 420 is positioned along a shorter one of the boundaries, that is, along the second boundary 410(2) in the exemplary configuration of FIG. 4 which provides for a more efficient design. For illustration purposes, the optical combiner 420 may be positioned with respect to the active geometric region 410 such that a line $L_{D3}$ which extends through each of the laser sources 414(1) substantially normal to each of the lines $L_n$ extending through the corresponding longitudinal axis of each signal channel 412, also extends through a portion of the combiner 420. More specifically, the line $L_{D3}$, as shown, extends through the plurality of waveguides 430. With the active geometric region 410 area generally equal to the active geometric region 210 area, and the total area of the substrate 401 generally equal to the total area of the substrate 201, or perhaps somewhat smaller since the reflective combiner 420 takes up less area than the combiner 220, a ratio of the active geometric region 410 area to the total area of the substrate 401 of photonic integrated circuit 400 is greater than or equal to about 0.5.

Optical waveguides 416 have a first end coupled to a corresponding one of the optical signal channels 412 and a second end coupled to the free space region 428. The first end of each of the optical waveguides 416 has a longitudinal axis equivalent to the longitudinal axis of the corresponding signal channel. For example, the line $L_1$ extending through the longitudinal axis of the signal channel 412(1) also extends through the longitudinal axis of the first end of optical waveguide 416(1). With the optical combiner 420 oriented as shown in FIG. 4, the second end of each of the optical waveguides 416 couples to the free space region 428 having a longitudinal axis generally parallel to a line $L_{FS5}$. As such, the longitudinal axis of each of the first ends of each of the optical waveguides 416 is substantially perpendicular to the longitudinal axes of each of the corresponding second ends of the optical waveguides 416. Each of the output waveguides 426 have a first end coupled to the free space region 428 of the optical combiner 420. Each of the first ends of the output waveguides 426 couples to the free space region 428 having a longitudinal axis generally parallel to a line $L_{FS6}$. A line $L_{O6}$ extends parallel to the longitudinal axis of a second end of each of the output waveguides 426(1), a line $L_{O7}$ extends parallel to the longitudinal axis of a second end of each of the alternative output waveguides 426(2), and a line $L_{O8}$ extends parallel to the longitudinal axis of a second end of each of the alternative output waveguides 426(3). The line $L_{FS6}$ being substantially perpendicular to the line $L_{O6}$ and $L_{O8}$, and substantially parallel to line $L_{O7}$.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A photonic integrated circuit, comprising:
a substrate having a surface and a plurality of edges, the surface having a first area defined by the plurality of edges of the substrate; and
a plurality of signal channels provided on the substrate, each of the plurality of signal channels comprising a plurality of optical elements, a first one of the plurality of signal channels defining a first boundary of a second area in the surface of the substrate, and a second one of the plurality of signal channels defining a second boundary of the second area, remaining ones of the plurality of signal channels are positioned between the first and second ones of the plurality of signal channels, such that the remaining ones of the plurality of signal channels are provided on the second area,
wherein a ratio of the second area to the first area is greater than or equal to about 0.5.

2. The photonic integrated circuit of claim 1, wherein each of the plurality of signal channels has a corresponding one of a plurality of longitudinal axes, each of the plurality of longitudinal axes being substantially parallel to the first boundary of the second area.

3. The photonic integrated circuit of claim 1, wherein the second area has a third boundary that extends from the first boundary to the second boundary and has a length greater than a length of the first boundary, each of the plurality of signal channels having a corresponding one of a plurality of longitudinal axes, each of the plurality of longitudinal axes being parallel to the third boundary of the second area.

4. The photonic integrated circuit of claim 1, further including an optical combiner provided on the substrate, the optical combiner having a plurality of inputs and an output, each of the plurality of signal channels including a corresponding one of a plurality of optical sources, each of the plurality of optical sources providing a corresponding one of a plurality of optical signals, each of the plurality of optical signals having a corresponding one of a plurality of wavelengths, each of the plurality of optical signals being coupled to a respective one of the plurality of inputs of the optical combiner, the optical combiner combining the plurality of optical signals into an optical output signal provided at the output of the optical combiner.

5. The photonic integrated circuit of claim 4, wherein the second area has a third boundary that extends from the first boundary to the second boundary and has a length that is greater than a length of the first boundary, the plurality of signal channels and the optical combiner arranged such that a line extending along the third boundary extends through a portion of the optical combiner.

6. The photonic integrated circuit of claim 4, wherein each of the plurality of optical signals are coupled to a respective one of the plurality of inputs of the optical combiner via a corresponding one of a plurality of first waveguides, each of the plurality of first waveguides having a first end coupled to a respective one of the plurality of signal channels and a second end coupled to a respective one of the plurality of inputs of the combiner, a longitudinal axis of the first end of each of the plurality of first waveguides being substantially parallel to a longitudinal axis of the second end of the plurality of first waveguides.

7. The photonic integrated circuit of claim 4, wherein each of the plurality of optical signals is coupled to a respective one of the plurality of inputs of the optical combiner via a corresponding one of a plurality of first waveguides, each of the plurality of first waveguides having a first end coupled to a respective one of the plurality of signal channels and a second end coupled to a respective one of the plurality of inputs of the combiner, a longitudinal axis of the first end of each of the plurality of first waveguides being substantially perpendicular to a longitudinal axis of the second end of the plurality of first waveguides.

8. The photonic integrated circuit of claim 4, wherein the photonic integrated circuit includes a plurality of facets, the output signal provided along a corresponding one of the plurality of facets via an output waveguide, the output waveguide having a first end coupled to the output of the optical combiner and a second end coupled to the corresponding one of the plurality of facets of the photonic integrated circuit.

9. The photonic integrated circuit of claim 8, wherein a longitudinal axis of the first end of the output waveguide is substantially parallel to a longitudinal axis of the second end of the output waveguide.

10. The photonic integrated circuit of claim 8, wherein a longitudinal axis of the first end of the output waveguide is substantially perpendicular to a longitudinal axis of the second end of the output waveguide.

11. The photonic integrated circuit of claim 6, wherein the optical combiner includes a free space region and a plurality of second waveguides, the free space region having a first end configured to couple to the second end of each of the plurality of first waveguides and provide the output signal along a corresponding one of a plurality of facets of the photonic integrated circuit via an output waveguide, the free space region having a second end configured to couple to a first end of each of the plurality of second waveguides, a second end of each of the plurality of second waveguides configured to couple to a corresponding one of the plurality of facets of the photonic integrated circuit.

12. The photonic integrated circuit of claim 1, wherein each of the plurality of signal channels includes a corresponding one of a plurality of modulators configured to receive a corresponding one of the plurality of optical signals and provide a corresponding one of a plurality of modulated optical signals at an output of the corresponding one of the plurality of modulators.

13. The photonic integrated circuit of claim 12, wherein each of the plurality of modulators is an electro-absorption modulator or a Mach-Zehnder modulator.

14. The photonic integrated circuit of claim 1, wherein each of the plurality of optical sources is a corresponding one of a plurality of modulated optical sources.

15. The photonic integrated circuit of claim 14, wherein each of the plurality of modulated optical sources comprises a corresponding one of a plurality of laser sources optically coupled to a corresponding one of a plurality of modulators.

16. The photonic integrated circuit of claim 15, wherein each of the plurality of modulators is an electro-absorption modulator or a Mach-Zehnder modulator, and each of the plurality of laser sources is a DFB laser or a DBR laser.

17. The photonic integrated circuit of claim 1, wherein each of the plurality of optical sources is a DFB laser or a DBR laser.

18. The photonic integrated circuit of claim 4, wherein the optical combiner is an arrayed waveguide grating or an Echelle grating.

19. The photonic integrated circuit of claim 1, wherein each of the plurality of active elements is selected from a group consisting of a laser source, a modulated laser source, an electro-absorption modulator, a Mach-Zehnder modulator, a semiconductor optical amplifier, a variable optical attenuator, a photodetector and a photodiode.

* * * * *